(12) United States Patent
Tsuboi

(10) Patent No.: US 9,560,220 B2
(45) Date of Patent: Jan. 31, 2017

(54) NETWORK SYSTEM AND CONTROL METHOD

(71) Applicant: CANON KABUSHIKI KAISHA, Tokyo (JP)

(72) Inventor: Masanori Tsuboi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/869,466

(22) Filed: Sep. 29, 2015

(65) Prior Publication Data
US 2016/0100069 A1    Apr. 7, 2016

(30) Foreign Application Priority Data
Oct. 2, 2014    (JP) ................ 2014-203716

(51) Int. Cl.
H04N 1/00         (2006.01)
H04L 29/08        (2006.01)
G06F 9/445        (2006.01)

(52) U.S. Cl.
CPC .......... *H04N 1/00244* (2013.01); *G06F 8/665* (2013.01); *H04L 67/34* (2013.01); *H04N 1/00344* (2013.01); *H04N 2201/001* (2013.01); *H04N 2201/0094* (2013.01)

(58) Field of Classification Search
CPC ............ H04N 1/00244; H04N 1/00344; H04N 2201/0094; H04N 2201/001; G06F 8/665; H04L 67/34

USPC ........................................ 358/1.15
See application file for complete search history.

(56) References Cited

U.S. PATENT DOCUMENTS

| | | | |
|---|---|---|---|
| 7,595,902 B2 * | 9/2009 | Yamaguchi | G06F 8/65 358/1.13 |
| 8,194,273 B2 * | 6/2012 | Yokokura | G06F 8/65 358/1.13 |
| 2006/0119884 A1 * | 6/2006 | Choi | G06K 15/00 358/1.15 |

FOREIGN PATENT DOCUMENTS

JP    2003-91427 A    3/2003

* cited by examiner

*Primary Examiner* — Kent Yip
(74) *Attorney, Agent, or Firm* — Canon USA, Inc., IP Divison

(57) ABSTRACT

In response to a request from an image forming apparatus, a separate apparatus identifies information on applicable firmware, determines whether warning is permitted based on an output ability of the image forming apparatus and a result of referring to a warning permission policy table, and transmits a response including the information on applicable firmware and warning permission information. When making the request and applying the firmware after receiving the response, in a case where the warning permission information indicates displaying of warning is permitted, the image forming apparatus determines a message to be output and displays the message based on the result of referring to the warning display pattern table.

10 Claims, 17 Drawing Sheets

FIG. 6

| COUNTRY | WARNING PERMITTED IN SERVICE MODE | WARNING PERMITTED IN USER MODE |
|---|---|---|
| JP | YES | NO |
| US | YES | NO |
| NL | YES | YES |
| SG | YES | YES |
| AU | YES | YES |
| CN | NO | NO |

| TYPE OF INSTALLED FIRMWARE | TYPE OF FIRMWARE TO BE INSTALLED | | |
|---|---|---|---|
| | GENERAL FIRMWARE | INDIVIDUAL FIRMWARE | BUSINESS FIRMWARE |
| GENERAL FIRMWARE | NONE | Msg. 1 | Msg. 1 |
| INDIVIDUAL FIRMWARE | Msg. 1 | Msg. 2 | Msg. 1 |
| BUSINESS FIRMWARE | Msg. 1 | Msg. 1 | NONE / Msg. 1 |

FIG. 8A

```
801 — firmversion   = XX.XX
802 — Family        = AAnnn
803 — WarningAbility = UserMode,ServiceMode
804 — Country       = XX
```

FIG. 8B

```
811 — firmversion   = 10.00
812 — Family        = NL000
813 — WarningAbility = UserMode
814 — Country       = JP
```

FIG. 8C

```
821 — firmversion   = 10.00
822 — Family        = SP000
823 — WarningAbility = UserMode,ServiceMode
824 — Country       = JP
```

FIG. 8D

```
831 — firmversion   = 10.00
832 — Family        = MA001
833 — WarningAbility = ServiceMode
834 — Country       = US
```

FIG. 8E

```
841 — firmversion   = 11.00
842 — Family        = MA001
843 — WarningAbility = ServiceMode
844 — Country       = US
```

FIG. 8F

```
851 — firmversion   = 11.00
852 — Family        = MA002
853 — WarningAbility = ServiceMode
854 — Country       = US
```

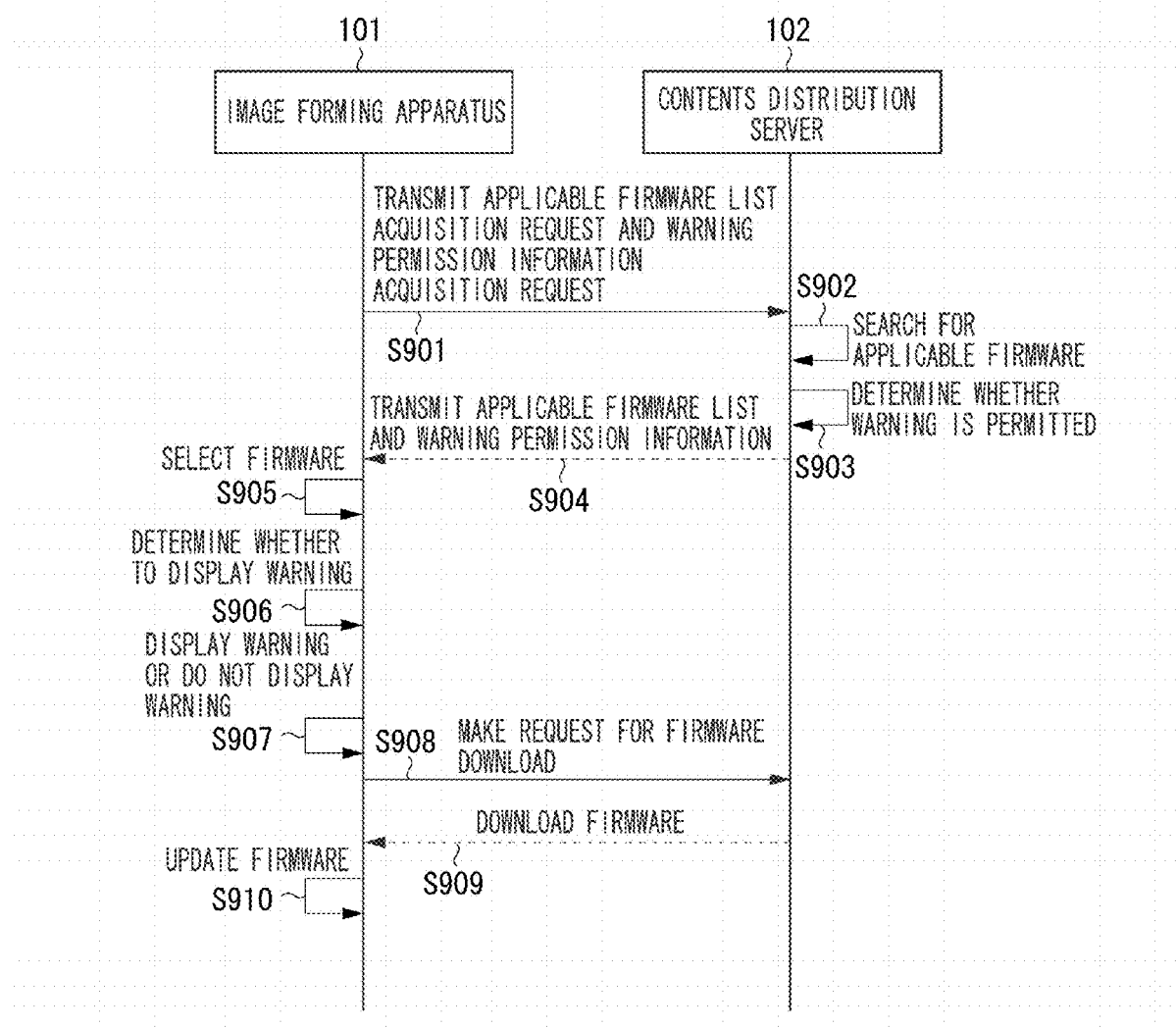

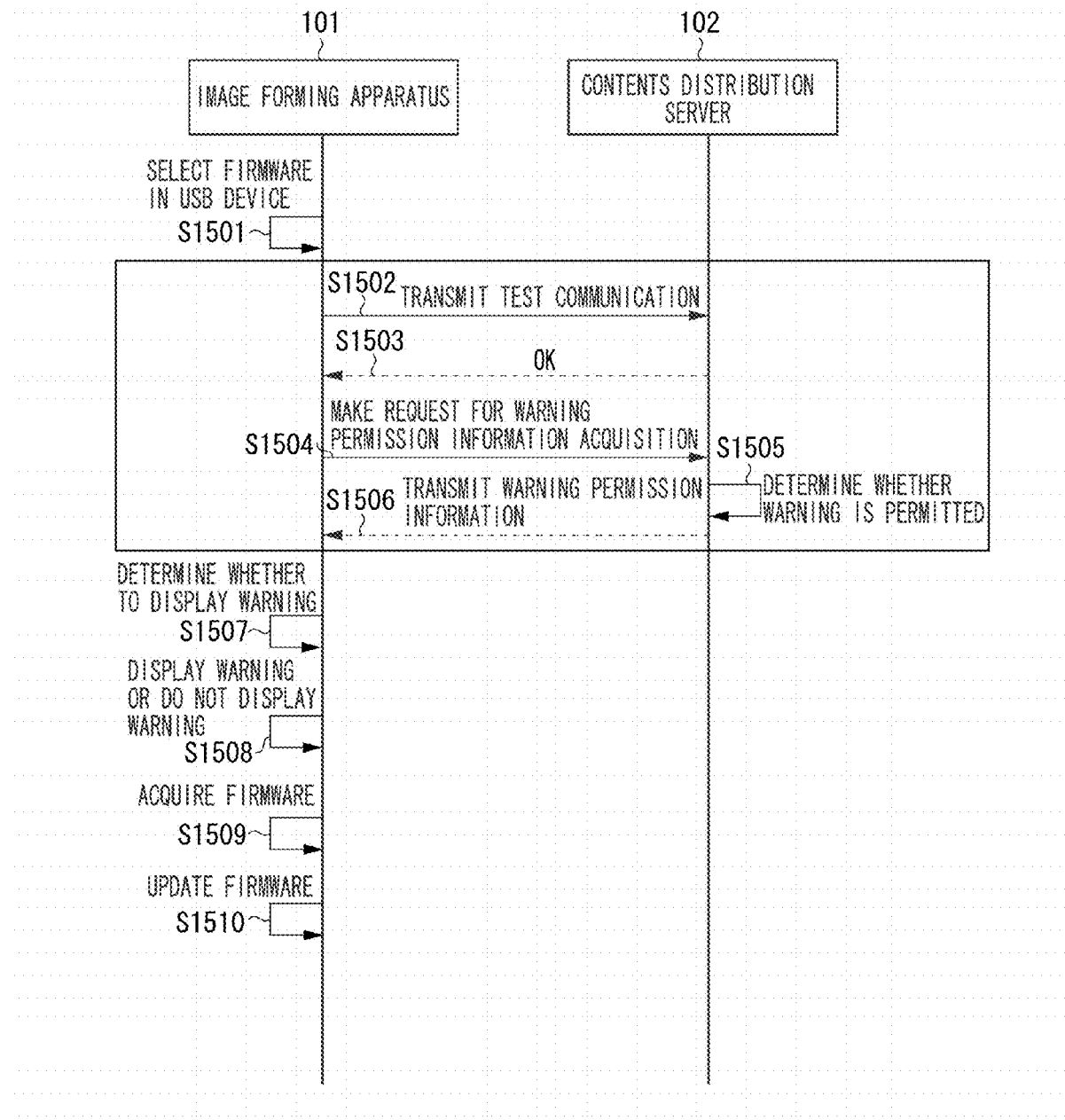

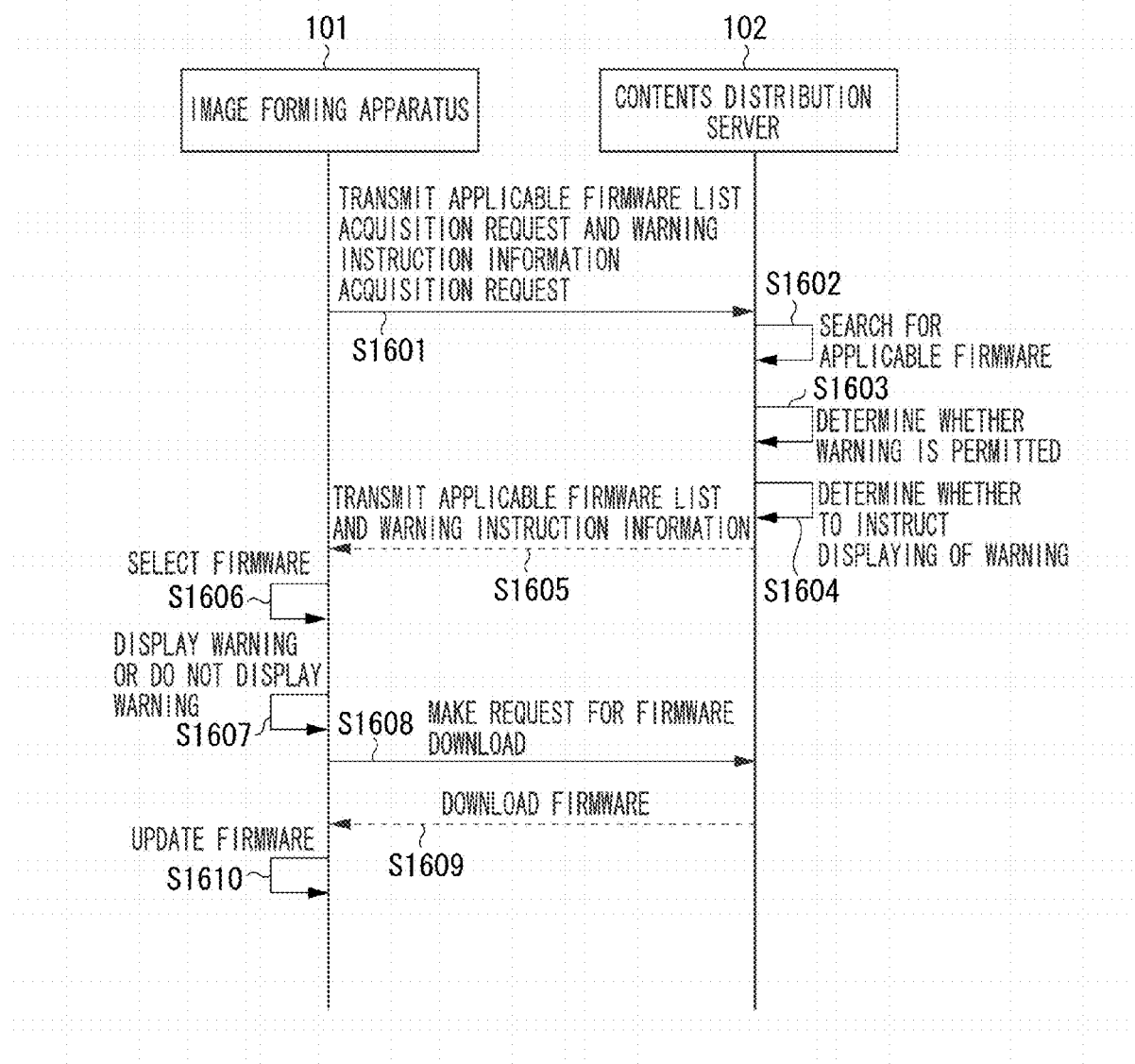

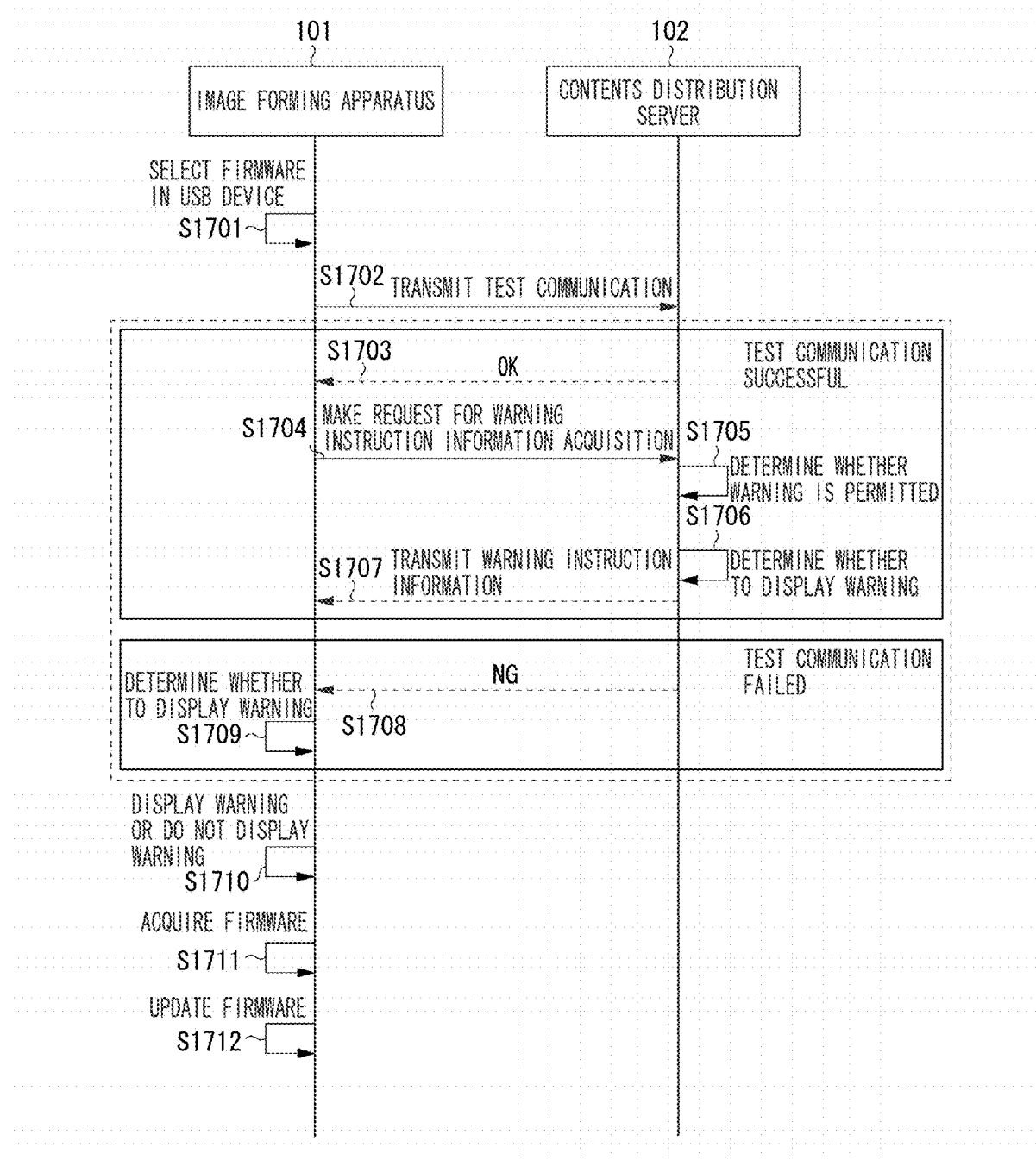

NETWORK SYSTEM AND CONTROL METHOD

BACKGROUND

Field

Aspects of the present invention generally relate to a management technique of managing firmware in an image forming apparatus via a network.

Description of the Related Art

In image forming apparatuses with firmware installed, the firmware is updated in some cases to add a new function and to correct a program.

The types of firmware include general firmware as well as business firmware, individual firmware, and the like. The general firmware is used in the image forming apparatuses by general users. The business firmware is customized for a specific business occasion. The individual firmware is individually released for an individual spot request.

Conventionally, the general firmware has been mainly released. However, to satisfy the recent increased customization demand, increasing numbers of business firmware and individual firmware have been released. Thus, there is a risk of erroneous update between different types of firmware (business firmware to general firmware).

Japanese Patent Application Laid-Open No. 2003-91427 discusses a technique of displaying a check screen when a piece of firmware is selected for firmware update.

However, in the technique discussed in 2003-91427, a warning is displayed only in a case where a version is upgraded or where a special specification has been set. Thus, a case where the version remains the same or where the version is downgraded is not taken into account. Furthermore, with the technique discussed in Japanese Patent Application Laid-Open No. 2003-91427, whether the warning is permitted to be displayed cannot be remotely or flexibly switched in accordance with an installed environment of an image forming apparatus including a condition unique to a country where the image forming apparatus is installed, or an operation mode of the image forming apparatus.

SUMMARY

Aspects of the present invention are generally directed to a mechanism for preventing erroneous update, in which a warning displayed by an image forming apparatus is flexibly controlled by a management system when an attempt is made to update firmware in the image forming apparatus.

A network system according to an aspect of the present invention includes an image forming apparatus and a management system configured to manage firmware in the image forming apparatus. The management system includes a first management unit configured to manage a first management table to determine whether a message related to firmware to be applied is able to be output according to an installed environment and an operation mode of the image forming apparatus, a first reception unit configured to receive a request for information on applicable firmware from the image forming apparatus, an identification unit configured to identify information on firmware applicable to the image forming apparatus from information on firmware that has been applied to the image forming apparatus included in the request, a first determination unit configured to determine, based on an output ability of the image forming apparatus in the request and a result of referring to the first management table, whether the message related to the firmware to be applied is able to be output by the image forming apparatus, and a response unit configured to transmit a response to the request, the response including the identified information on firmware and information indicating whether the message is able to be output as a result of the determination by the first determination unit. The image forming apparatus includes a second management unit configured to manage a second management table to determine a message to be output according to a type of firmware, a request unit configured to make the request, a second reception unit configured to receive the response, a second determination unit configured to determine a message to be output based on a result of referring to the second management table in a case where the response includes the information indicating that the message is able to be output, when firmware is applied, and a control unit configured to control displaying of the message determined by the second determination unit.

Further features of the present disclosure will become apparent from the following description of exemplary embodiments with reference to the attached drawings.

BRIEF DESCRIPTION OF THE DRAWINGS

FIG. 6 is a warning permission policy table held and managed in the contents distribution server.

FIG. 7 is a warning display pattern table held and managed in the image forming apparatus.

FIGS. 8A, 8B, 8C, 8D, 8E, and 8F each illustrate a file for managing attribute information of firmware held in the image forming apparatus.

FIG. 9 is a sequence diagram illustrating processing in a first exemplary embodiment.

FIG. 15 is a sequence diagram illustrating processing in a second exemplary embodiment.

FIG. 16 is a sequence diagram illustrating processing in a third exemplary embodiment.

FIG. 17 is another sequence diagram illustrating processing in the third exemplary embodiment.

DESCRIPTION OF THE EMBODIMENTS

Exemplary embodiments of the present invention are described in detail below with reference to the drawings. It is to be noted that components described in the exemplary embodiments are merely examples, and the scope of aspects of the invention are not limited to such components.

Figure 1:
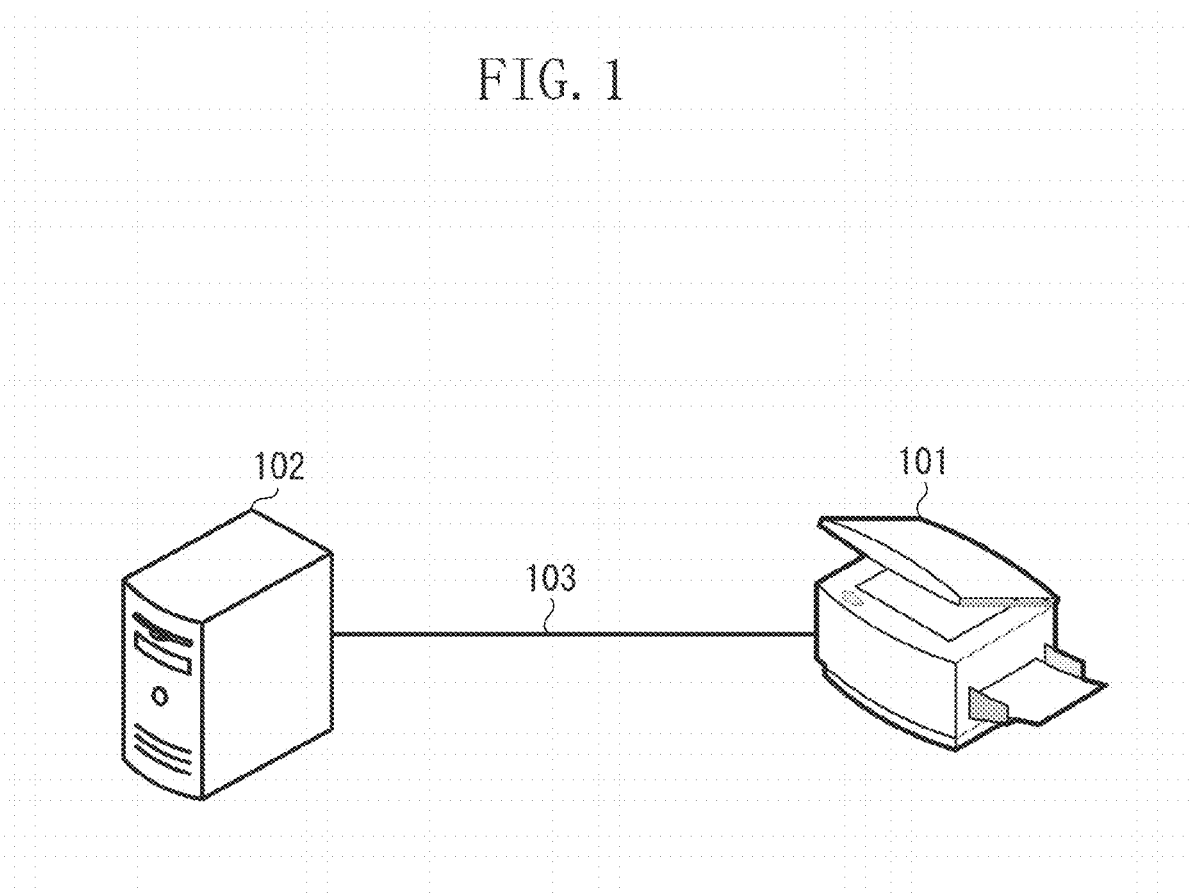
FIG. 1 is a diagram illustrating a configuration of a network system according to an exemplary embodiment.

FIG. 1 is a diagram illustrating an example of a configuration of a network system according to an exemplary embodiment.

In FIG. 1, an image forming apparatus 101 is a multi-function peripheral (MFP) and the like as a single apparatus having functions as a printer, a scanner, a copier, a fax machine, and the like. A unique serial number is allocated to the image forming apparatus 101.

A contents distribution server 102 is a management system that manages firmware in the image forming apparatus 101. The contents distribution server 102 is used for distributing firmware to the image forming apparatus 101. The contents distribution server 102 may be formed of a plurality of information processing apparatuses.

A network 103 is the Internet, an intranet, or other network. The image forming apparatus 101 can communicate with the contents distribution server 102 via the network 103. Although not illustrated in FIG. 1, a plurality of image forming apparatuses is connected to the network 103.

Figure 2:
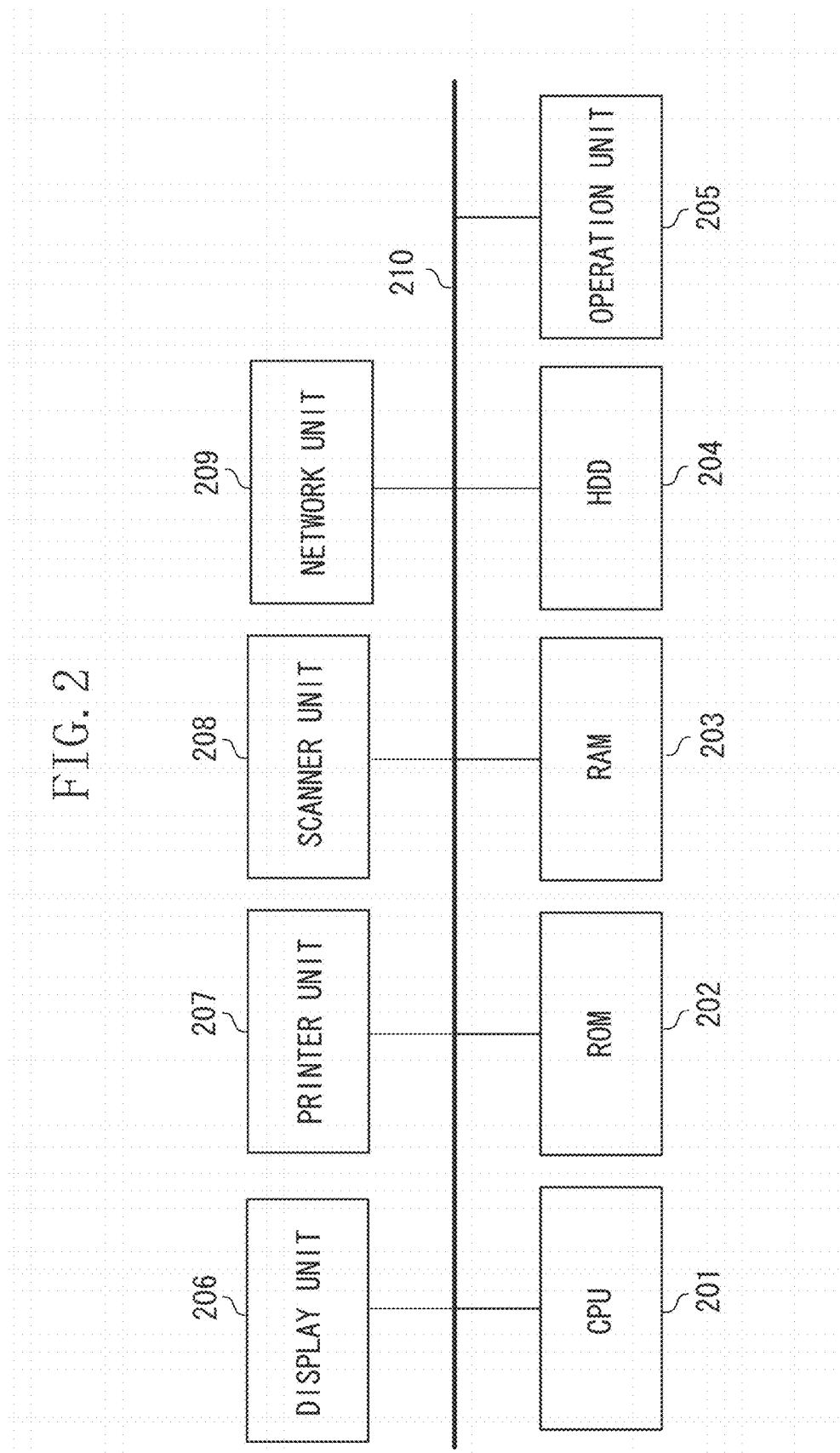
FIG. 2 is a diagram illustrating a hardware configuration of an image forming apparatus.

FIG. 2 is a diagram illustrating a hardware configuration of the image forming apparatus 101.

A central processing unit (CPU) 201 executes various programs and implements various functions. A read only memory (ROM) 202 stores various programs.

A random access memory (RAM) 203 is a system work memory on which the CPU 201 operates and that temporarily stores various data. The CPU 201 loads a program stored in the ROM 202, a hard disk drive (HDD) 204, or the like onto the RAM 203 and executes the program as appropriate. Examples of the RAM 203 include a ferroelectric random access memory (FRAM®) and a static random access memory (SRAM) in which the stored contents can be held after the power is turned OFF, as well as a dynamic random access memory (DRAM) in which the stored content is erased after the power is turned OFF.

The HDD 204 is a unit that stores various programs. Data in the RAM 203 can be stored in the HDD 204.

An operation unit 205 is to control the image forming apparatus 101. A display unit 206 is to display a user interface (UI) of the image forming apparatus 101. The display unit 206 displays a menu for a service person that is referred to as a service mode, and a menu for an end user that is referred to as a user mode.

A printer unit 207 can transmit and receive data to and from each unit via a bus 210. The printer unit 207 is capable of printing various image data such as a raster image onto a recording medium or transmitting the image data to an external apparatus. A scanner unit 208 is to read a document on a platen, and to generate image data. A network unit 209 is to communicate with other apparatuses via the network 103. The network unit 209 is capable of establishing connection to the contents distribution server 102 via the network 103. Each of the units described above can transmit and receive data to and from each other through the bus 210.

Figure 3:
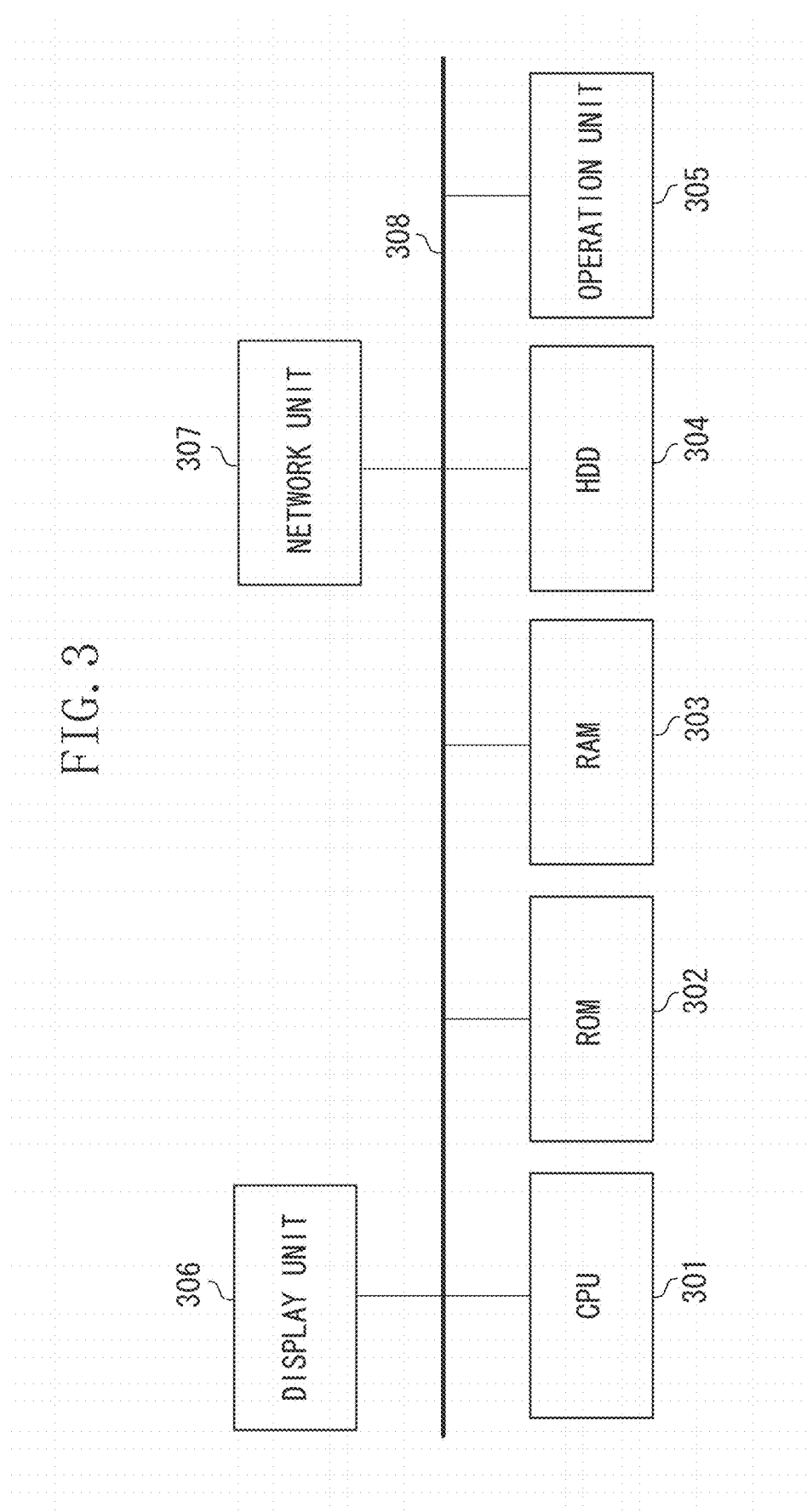
FIG. 3 is a diagram illustrating a hardware configuration of a contents distribution server.

FIG. 3 is a diagram illustrating an example of a hardware configuration of the contents distribution server 102.

Units 301 to 306 and 308 in FIG. 3 are respectively the same as the units 201 to 206 and 210 described above, and thus will not be described. A network unit 307 is for communicating with other apparatuses via the network 103. The network unit 307 can establish connection with the image forming apparatus 101 via the network 103. As described above, the contents distribution server 102 may be formed of a plurality of information processing apparatuses.

Figure 4:
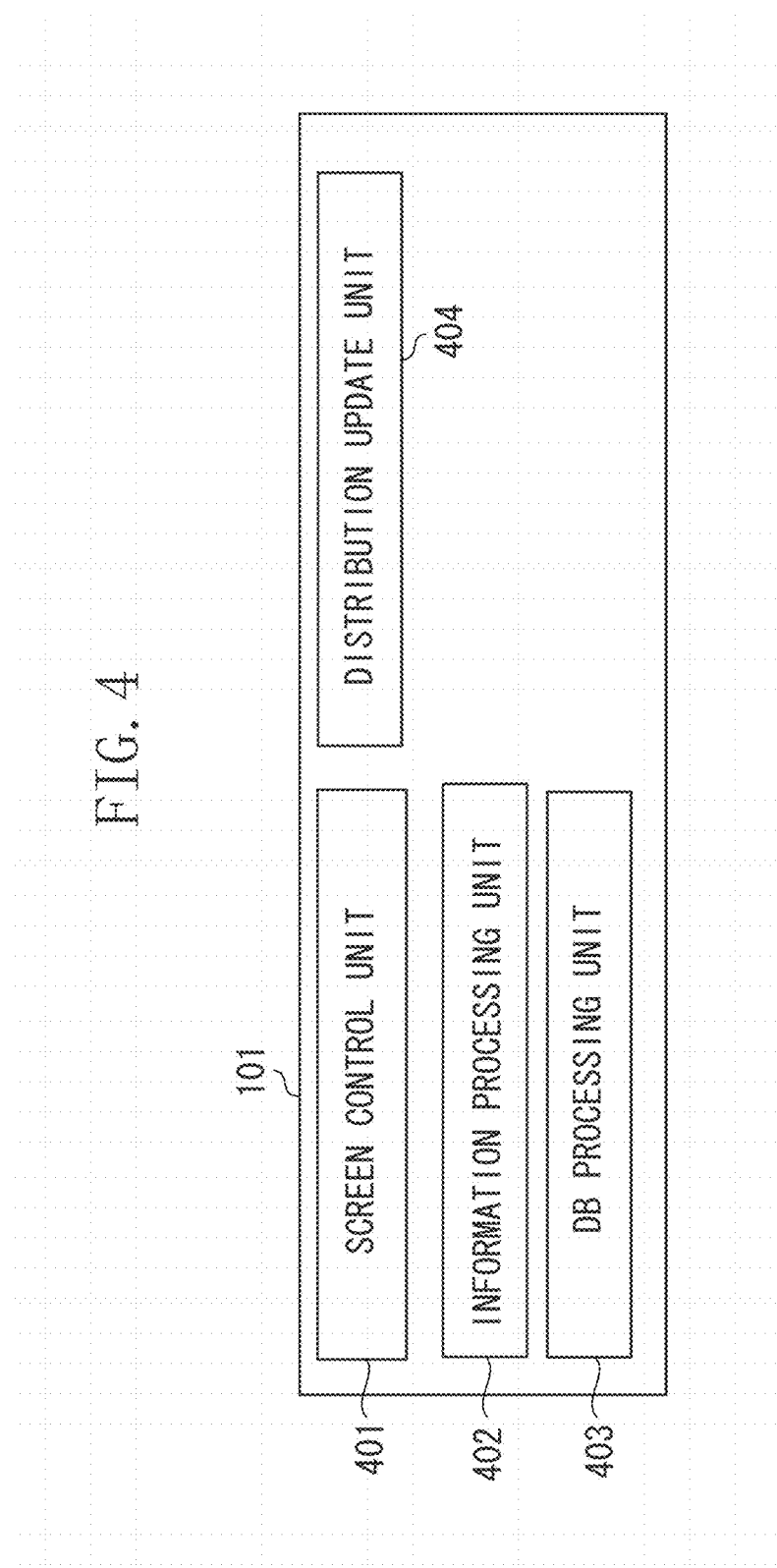
FIG. 4 is a diagram illustrating a software configuration of the image forming apparatus.

FIG. 4 is a diagram illustrating a software configuration of the image forming apparatus 101. Programs for implementing components in FIG. 4 are stored in the HDD 204 or the ROM 202. The components in FIG. 4 are implemented by the CPU 201 loading the programs onto the RAM 203 and executing the programs as appropriate.

A screen control unit 401 in FIG. 4 controls a menu display with which firmware update is performed. An information processing unit 402 performs temporal storing of information, calculation, and the like. A database (DB) processing unit 403 manages information transmitted to the contents distribution server 102. The information managed by the DB processing unit 403 is stored in the HDD 204 of the image forming apparatus 101, for example. A distribution update unit 404 provides a function for acquiring firmware from the contents distribution server 102.

Figure 5:
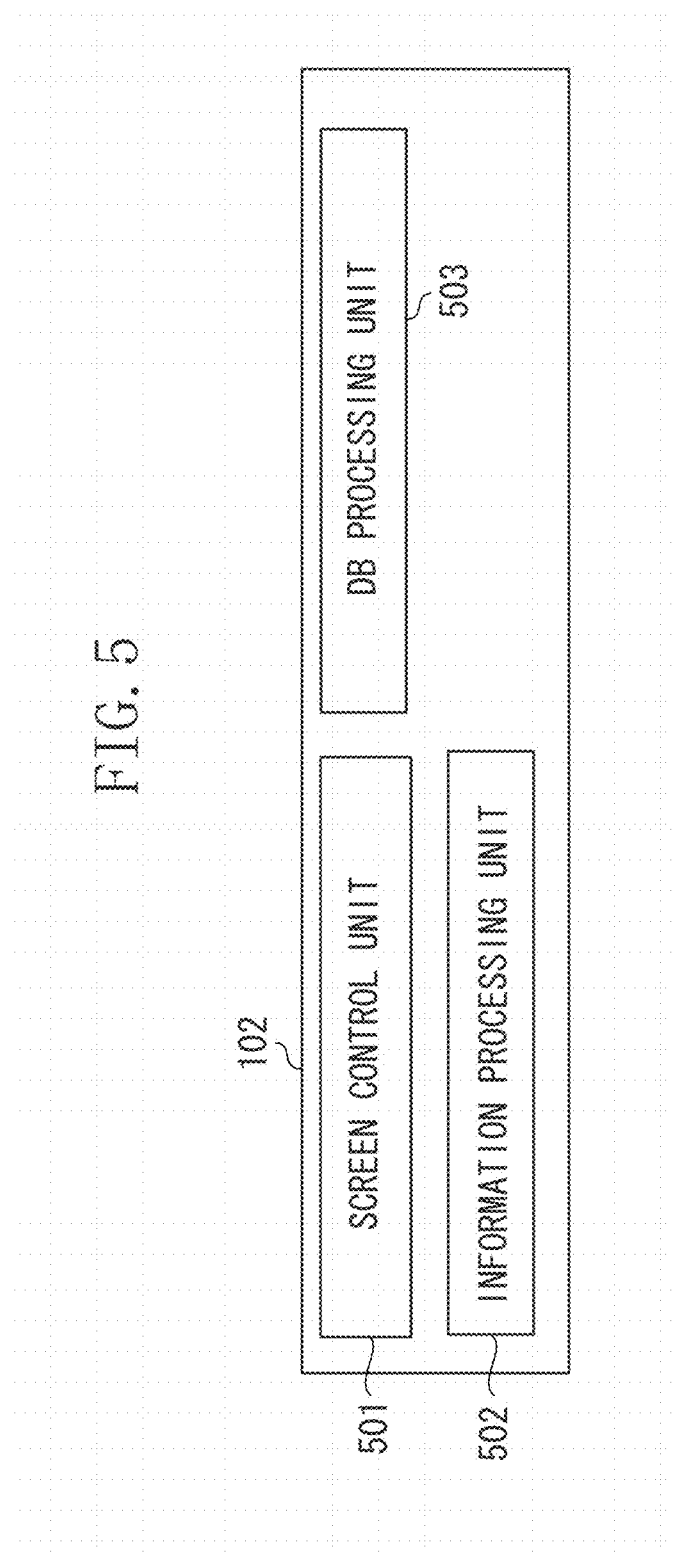
FIG. 5 is a diagram illustrating a software configuration of the contents distribution server.

FIG. 5 is a diagram illustrating an example of a software configuration of the contents distribution server 102. Programs for implementing components in FIG. 5 are stored in the HDD 304 or the ROM 302. The components in FIG. 5 are implemented by the CPU 301 loading the programs onto the RAM 303 and executing the programs as appropriate.

A screen control unit 501 in FIG. 5 controls a menu display of the contents distribution server 102. An information processing unit 502 performs temporary storing of information, calculation, and the like. A DB processing unit 503 refers to and registers DB information held in the contents distribution server 102. The information managed by the DB processing unit 503 is stored in the HDD 304 of the contents distribution server 102, for example.

FIG. 6 is a diagram illustrating an example of a warning permission policy table 600, for warning display, held and managed in the HDD 304 by the contents distribution server 102.

The warning permission policy table 600 is a management table in which whether displaying of a warning screen on the display unit 306 is permitted in firmware update executed in the image forming apparatus 101 is set when, for example, the current firmware is different from firmware to be installed.

As illustrated in FIG. 6, the warning permission policy table 600 includes items of a country 601, warning permitted in a service mode 602, warning permitted in a user mode 603, and the like. In the warning permission policy table 600, whether the warning is permitted in the service mode (602) and permitted in the user mode (603) are set for each country (601). Thus, the warning permission policy table 600 is a management table holding information used for determining whether to output a message indicating applicable firmware, in accordance with an installed environment of the image forming apparatus 101 such as the country (601) and an operation mode such as the service mode and the user mode. The warning permission policy table 600 is set by an administrator or the like of the contents distribution server 102, and has been stored in the HDD 304 of the contents distribution server 102 in advance.

FIG. 7 is a diagram illustrating an example of a warning display pattern table 700, held and managed by the image forming apparatus 101, in the HDD 204.

As illustrated in FIG. 7, the warning display pattern table 700 includes items such as a type of installed firmware 701, a type of firmware to be installed 702, and the like. The warning display pattern table 700 is a management table that manages messages displayed for the type of installed firmware (701) and the type of firmware to be installed (702).

Figure 13:
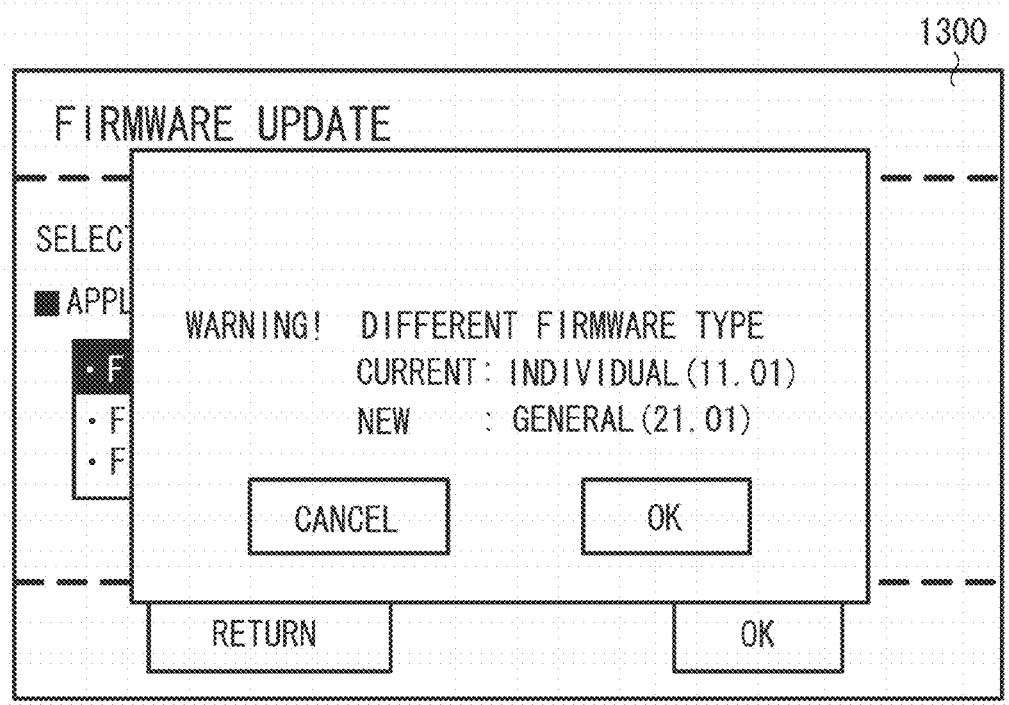
FIG. 13 is a diagram illustrating an example of a UI screen, on which a warning is displayed, in the image forming apparatus.

For example, "Msg. 1" exemplified in the warning display pattern table 700 indicates that a message "Warning! Different firmware type" (a warning message indicating that the type of the applied firmware and the type of the firmware to be applied are different from each other) as illustrated in FIG. 13 described later is displayed. Further, "Msg. 2" indicates that a message "Check! Same firmware type" (message for causing a user to perform checking) illustrated in FIG. 14 described below is displayed. Furthermore, "NONE" indicates that no message is displayed.

General firmware 703 as the type of firmware to be installed 702 is firmware used in the image forming apparatus 101 by a general user. Individual firmware 704 is firmware individually released for an individual spot request. Business firmware 705 is firmware customized for a specific business occasion.

The type of installed firmware 701 is specified by the distribution update unit 404 based on a value of a Family attribute 802 in FIG. 8A described below. The type of firmware to be installed 702 is specified by the distribution update unit 404 based on the value of the Family attribute received from the contents distribution server 102.

For example, in the example of the warning display pattern table 700 illustrated in FIG. 7, "NONE", indicating that the warning is not displayed, corresponds to a case where the type of installed firmware 701 is the general firmware 703 and the type of firmware to be installed 702 is the general firmware 703. Msg. 1, that is, "Warning! Different firmware type" is displayed when the type of installed firmware 701 is the individual firmware 704 and the type of firmware to be installed 702 is the general firmware 703.

Further, the warning display pattern table 700 indicates that no message may be displayed or Msg. 1 may be displayed when the type of installed firmware 701 is the business firmware 705 and the type of firmware to be installed 702 is the business firmware 705. More specifically, no message is displayed when the firmware corresponding to the same business occasion is to be installed, and Msg. 1 is displayed when the firmware corresponding to a different business occasion is to be installed. Whether the business occasion is the same or different is determined based on the Family attribute 802 in FIG. 8A described below.

Thus, the warning display pattern table 700 is a management table that holds information for determining a message to be output in accordance with the type of firmware. The warning display pattern table 700 has been stored in the HDD 204 in advance.

FIG. 8 is a diagram illustrating an example of a file for managing attribute information of firmware in the image forming apparatus 101, held in the HDD 204 of the image forming apparatus 101. The file (a text file, for example) describes information on the applied firmware in the image forming apparatus 101, and is updated when the firmware is updated.

FIG. 8A illustrates a format of a file for managing attribute information of firmware. A firmversion attribute 801 is a four-digit representation of a firmware version. The Family attribute 802 is a five-digit representation of a firmware type. The first two digits "AA" in the Family attribute 802 are a type identifier. More specifically, "NL" indicates the general firmware 703, "SP" indicates the individual firmware 704, and "MA" indicates the business firmware 705. The last three digits "nnn" in the Family attribute 802 are a user identifier. This sequence identifier is sequentially allocated to the business firmware 705 from "001". The same user identifier indicates that the type of the business firmware is the same (the firmware corresponding to the same business occasion). On the other hand, a different user identifier indicates that the type of the business firmware is different (firmware corresponding to a different business occasion). The last three digits of the Family attribute 802 are fixed to "000" for the firmware other than the business firmware 705.

A WarningAbility attribute 803 indicates warning display ability of the image forming apparatus 101. When the image forming apparatus 101 has the warning display ability effective only in the user mode, "UserMode" is described as the WarningAbility attribute 803. When the image forming apparatus 101 has the warning display ability effective only in the service mode, "ServiceMode" is described as the WarningAbility attribute 803. When the image forming apparatus 101 has the warning display ability effective both in the user mode and the service mode, "UserMode,ServiceMode", in which the modes are sectionalized with a comma, is described as the WarningAbility attribute 803. A Country attribute 804 is a two-digit representation of country information.

FIGS. 8B to 8F each illustrate a specific example of a file for managing attribute information of firmware.

FIG. 8B illustrates an example where the firmware version is "10.00", the type of the firmware is "general firmware", the warning display ability is effective in the "user mode", and the country information is "JP".

FIG. 8C illustrates an example where the firmware version is "10.00", the type of the firmware is "individual firmware", the warning display ability is effective in both the "user mode" and the "service mode", and the country information is "JP".

FIG. 8D illustrates an example where the firmware version is "10.00", the type of the firmware is "business firmware", the warning display ability is effective in the "service mode", and the country information is "US".

FIG. 8E illustrates an example where the firmware version is "11.00", the type of the firmware is "business firmware" that is the same type as that in FIG. 8D, the warning display ability is effective in the "service mode", and the country information is "US".

FIG. 8F illustrates an example where the firmware version is "11.00", the type of the firmware is "business firmware" that is a different type from that in FIGS. 8D and 8E, the warning display ability is effective in the "service mode", and the country information is "US".

A sequence of processing executed by the image forming apparatus 101 and the contents distribution server 102, through which the image forming apparatus 101 performs warning screen displaying, is described below with reference to FIGS. 9 to 14.

FIG. 9 is a diagram illustrating a sequence of processing executed by the image forming apparatus 101 and the contents distribution server 102 according to a first exemplary embodiment, through which the image forming apparatus 101 performs warning screen displaying. The processing executed by the image forming apparatus 101 illustrated in FIG. 9 is executed by the CPU 201 loading a program stored in the HDD 204 or the ROM 202 onto the RAM 203 and executing the program as appropriate. The processing executed by the contents distribution server 102 illustrated in FIG. 9 is executed by the CPU 301 loading a program stored in the HDD 304 or the ROM 302 onto the RAM 303 and executing the program as appropriate.

FIGS. 11 to 14 are each a diagram illustrating an example of a UI screen displayed on the operation unit 205 of the image forming apparatus 101.

Figure 11:
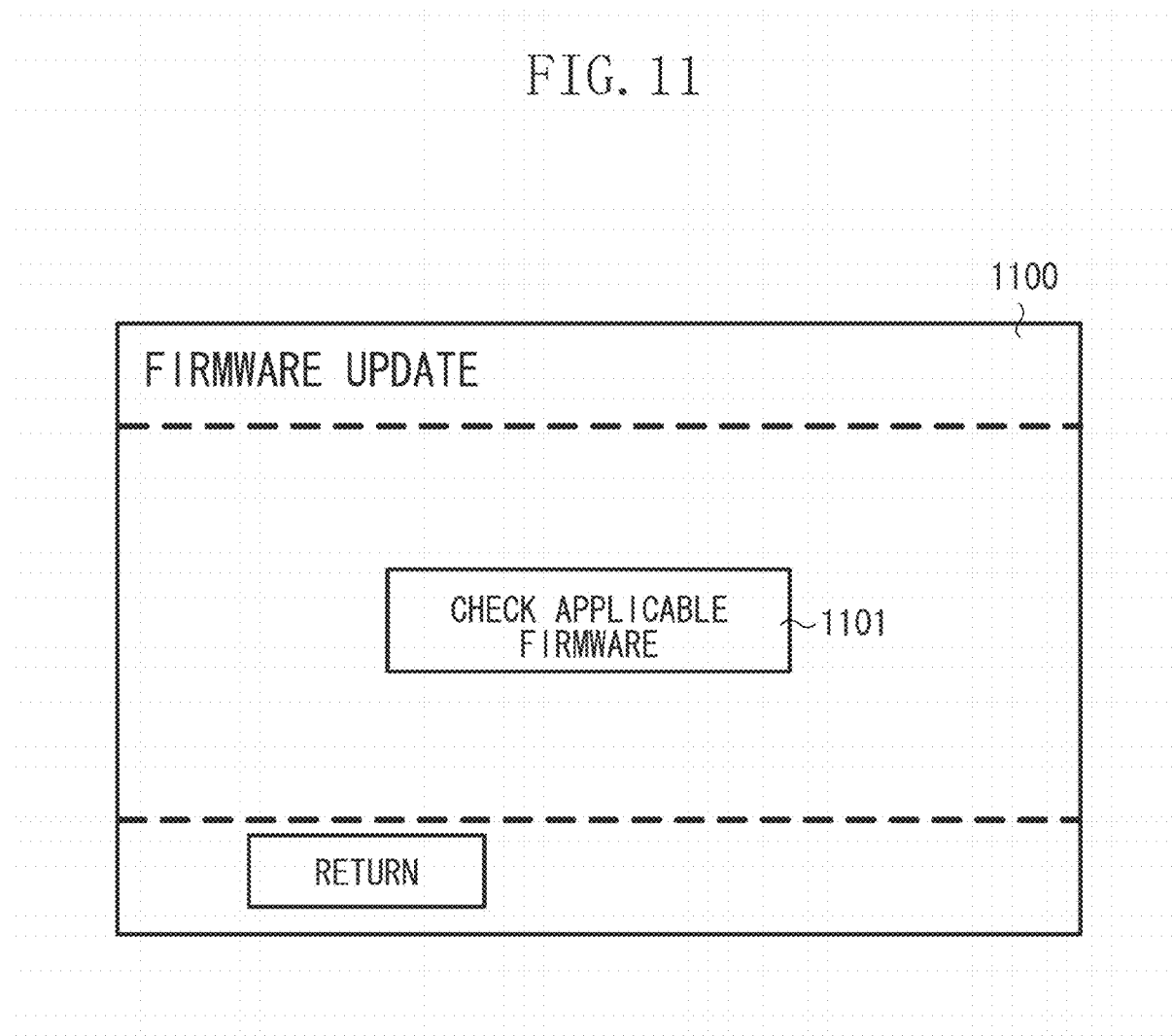
FIG. 11 illustrates an example of a user interface (UI) screen on the image forming apparatus.

First of all, when an applicable firmware check button 1101 on a UI screen 1100 in FIG. 11, displayed on the operation unit 205 of the image forming apparatus 101, is pressed, the image forming apparatus 101 detects this operation and executes processing in step S901. The UI screen 1100 in FIG. 11 is displayed when a user performs a predetermined operation on the operation unit 205 of the image forming apparatus 101.

In step S901, the image forming apparatus 101 transmits an applicable firmware list acquisition request and a warning permission information acquisition request to the contents distribution server 102. The applicable firmware list acquisition request is used to request for information on firmware applicable to the image forming apparatus 101. The warning permission information acquisition request is used to request for information indicating whether a message corresponding to the applied firmware can be output. When making these requests, the image forming apparatus 101 transmits to the contents distribution server 102 information including a value of the firmversion attribute 801, a value of the WarningAbility attribute 803, a value of the Country attribute 804, and an operator based classification of a currently being executed mode (the service mode/the user mode). The contents distribution server 102 receives the applicable firmware list acquisition request and the warning permission information acquisition request transmitted from the image forming apparatus 101.

In step S902, the contents distribution server 102 searches for the applicable firmware based on the value of the firmversion attribute 801 received in step S901 (version information of the firmware that has been applied to the image forming apparatus 101), and thus identifies the information on the firmware applicable to the image forming apparatus 101.

Then, in step S903, the contents distribution server 102 determines whether the warning is permitted in accordance with the warning permission policy table 600 by using the value of the WarningAbility attribute 803 received in step S901 (an output ability of the image forming apparatus 101 corresponding to the firmware that has been applied to the image forming apparatus 101), the value of the Country attribute 804, and the operator based classification of the currently being executed mode (operation mode such as the service mode/the user mode). In other words, the contents distribution server 102 determines whether a message corresponding to the firmware to be applied to the image forming apparatus 101 can be output by the image forming apparatus 101. The processing is to be described in detail with reference to FIG. 10.

Now, the processing of determining whether the warning is permitted in step S903 is described.

Figure 10:
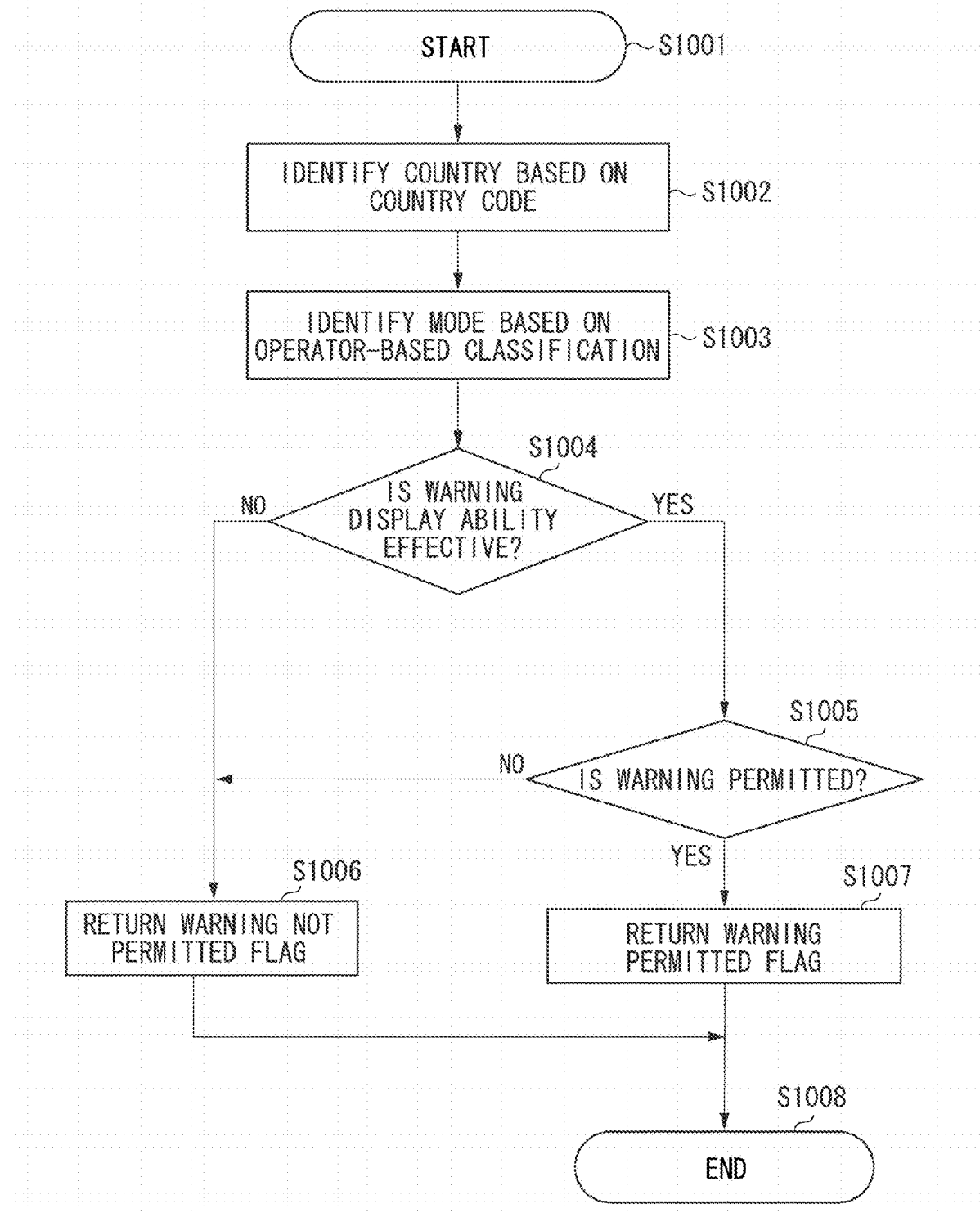
FIG. 10 is a flowchart illustrating processing executed by the contents distribution server to determine whether warning is permitted.

FIG. 10 is a flowchart illustrating an example of processing executed by the contents distribution server 102 to determine whether the warning is permitted in step S903 in FIG. 9. The processing in this flowchart is executed by the CPU 301 loading a program stored in the HDD 304 or the ROM 302 of the contents distribution server 102 and executing the program as appropriate.

In step S1001, the CPU 301 of the contents distribution server 102 starts the processing of determining whether the warning is permitted. In step S1002, the CPU 301 identifies country information on the image forming apparatus 101 by using the value of the Country attribute 804 received from the image forming apparatus 101 in step S901 in FIG. 9

In step S1003, the CPU 301 identifies a mode (the service mode/the user mode) based on the operator based classification received from the image forming apparatus 101 in step S901 in FIG. 9.

In step S1004, the CPU 301 determines whether the warning display ability is effective in the mode identified in step S1003 described above, based on the value of the WarningAbility attribute 803 received from the image forming apparatus 101 in step S901 in FIG. 9.

For example, it is determined that the warning display ability is effective when the mode based on the operator based classification is the "service mode", and the WarningAbility attribute 803 is the "ServiceMode" or the "UserMode,ServiceMode". It is also determined that the warning display ability is effective when the mode based on the operator based classification is the "user mode", and the WarningAbility attribute 803 is the "UserMode" or the "UserMode,ServiceMode". On the other hand, it is determined that the warning display ability is ineffective when the mode based on the operator based classification is the "service mode", and the WarningAbility attribute 803 is the "UserMode". It is also determined that the warning display ability is ineffective when the mode based on the operator based classification is the "user mode", and the WarningAbility attribute 803 is the "ServiceMode".

When it is determined that the warning display ability is ineffective (No in step S1004), the CPU 301 returns a warning not permitted flag in step S1006 and the processing ends in step S1008.

On the other hand, when it is determined that the warning display ability is effective (Yes in step S1004), the CPU 301 refers to the warning permission policy table 600 illustrated in FIG. 6 to determine whether the warning is permitted in step S1005. Under a condition that the country information is "JP" in the example illustrated in FIG. 6, it is determined that the warning is permitted when the mode based on the operator based classification is the "service mode", and it is determined that the warning is not permitted when the mode based on the operator based classification is the "user mode".

When it is determined that the warning is permitted (Yes in step S1005), the CPU 301 returns a warning permitted flag in step S1007, and the processing ends in step S1008.

On the other hand, when it is determined that the warning is not permitted (No in step S1005), the CPU 301 returns the warning not permitted flag in step S1006, and the processing ends in step S1008.

A description is given below by referring back to the sequence diagram in FIG. 9.

In step S904, the contents distribution server 102 transmits the applicable firmware list and the warning permission information to the image forming apparatus 101, as a response to the requests received in step S901 described above. The applicable firmware list is a list of firmware identified in step S902 described above. The warning permission information is to indicate whether a message corresponding to the firmware to be applied to the image forming apparatus 101 can be output based on the result of determining whether the warning is permitted in step S903 described above (the warning permitted flag or the warning not permitted flag). The image forming apparatus 101 receives the applicable firmware list and the warning permission information transmitted from the contents distribution server 102.

Figure 12:
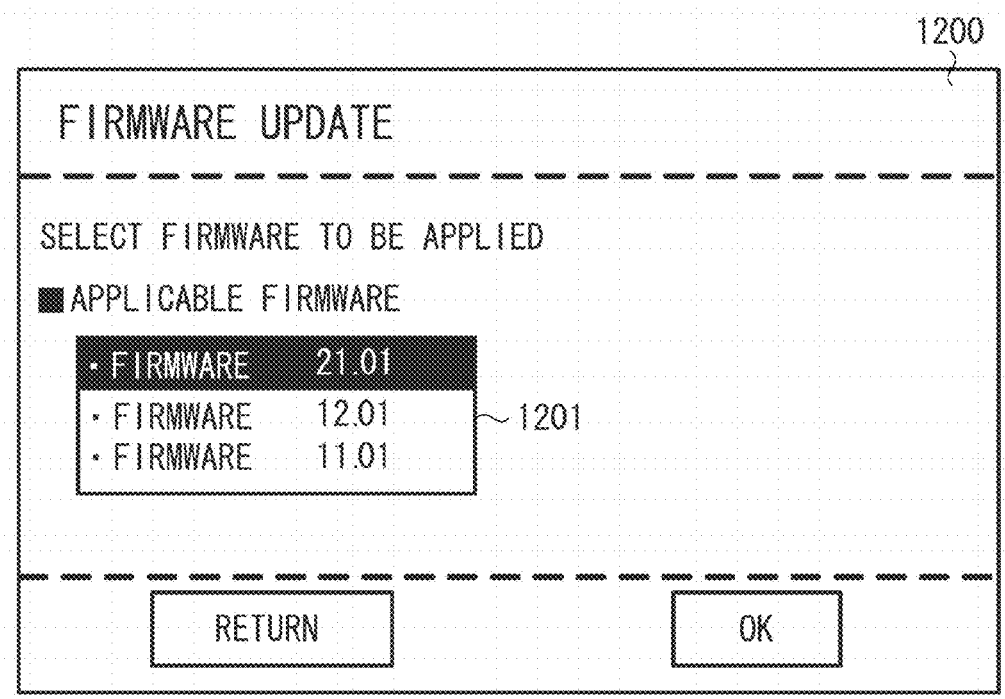
FIG. 12 illustrates an example of a UI screen on the image forming apparatus.

In step S905, the screen control unit 401 of the image forming apparatus 101 displays a UI screen 1200, as illustrated in FIG. 12, on the operation unit 205 based on the applicable firmware list received in step S904 described above, and detects the firmware selected by the user. When the user selects one piece of applicable firmware displayed on the screen 1201 and presses an OK button, the processing proceeds to step S906.

In step S906, the image forming apparatus 101 determines whether to display the warning based on the warning permission information received in step S904 described above and the warning display pattern table 700 illustrated in FIG. 7. More specifically, when the warning permission information indicates that a message can be output, the image forming apparatus 101 determines the message to be output from a result of referring to the warning display pattern table 700 illustrated in FIG. 7.

The processing of determining the message to be output from the result of referring to the warning display pattern table 700 illustrated in FIG. 7 is described in detail.

For example, when the installed firmware is "individual firmware" and the firmware selected in step S905 described above is "general firmware", Msg. 1, that is, the message illustrated in FIG. 13 for example, is determined to be displayed. When the installed firmware is "individual firmware" and the firmware selected in step S905 described above is also "individual firmware", Msg. 2, that is, the message illustrated in FIG. 14, for example, is determined to be displayed.

When the warning permission information indicates that the message cannot be output, the image forming apparatus 101 determines not to display the warning in step S906 described above, and the processing proceeds to step S907.

Figure 14:
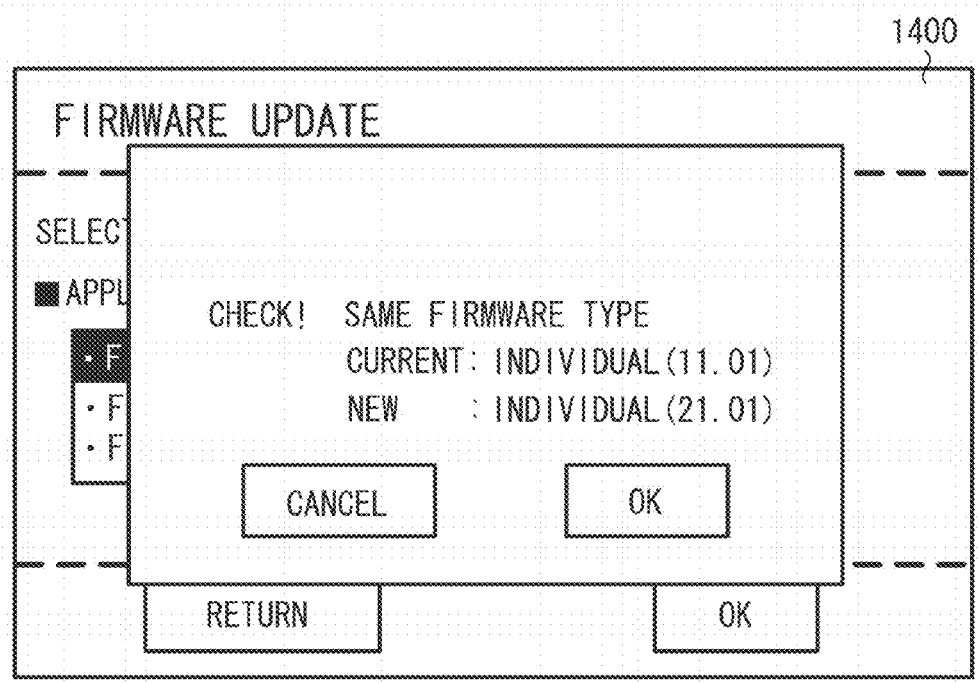
FIG. 14 is a diagram illustrating an example of a UI screen, on which a warning is displayed, in the image forming apparatus.

In step S907, the image forming apparatus 101 displays or does not display the warning based on the determination made in step S906 described above. When it is determined that the warning is to be displayed in step S906 described above (the result indicates the message to be output), the screen control unit 401 of the image forming apparatus 101 controls the displaying of the message determined to be displayed in step S906 described above (for example, the UI screen 1300 as illustrated in FIG. 13 or the UI screen 1400 as illustrated in FIG. 14) on the operation unit 205. When an OK button in the UI screen on which the warning is displayed is pressed, the processing proceeds to step S908. On the other hand, when a "cancel" button in the UI screen on which the warning is displayed is pressed, the processing in this sequence ends without any further processing.

When it is determined that the warning is not to be displayed in step S906 described above, the screen control unit 401 of the image forming apparatus 101 does not display the warning, and the processing proceeds to step S908.

In step S908, the image forming apparatus 101 transmits a download request for the firmware selected in step S905 described above to the contents distribution server 102, and, in step S909, downloads the firmware. The contents distribution server 102 transmits the firmware to the image forming apparatus 101.

Then, in step S910, the image forming apparatus 101 updates the firmware in the image forming apparatus 101 with the firmware downloaded in step S909 described above.

Through the processing described above, whether the warning display is permitted on a side of the image forming apparatus 101 can be flexibly changed on a side of the contents distribution server 102, in accordance with the installed environment, the operation mode, and the like of the image forming apparatus 101.

When the image forming apparatus 101 performs firmware update, firmware may be acquired from a local environment, such as a universal serial bus (USB) device, instead of being acquired from the contents distribution server 102 and the like through a network (the firmware may be acquired from a source other than the management system including the contents distribution server 102). In such a case, no access is made to the contents distribution server 102, and thus the operation in accordance with the warning display policy set in FIG. 6 on the side of the contents distribution server 102 cannot be performed only with the configuration of the first exemplary embodiment described above. In this second exemplary embodiment, a configuration is described in which only an inquiry related to the warning display policy in FIG. 6 is made to the contents distribution server 102 when the firmware is acquired from a local environment, such as a USB device.

A sequence of the following processing is described below with reference to FIG. 15. More specifically, in a case where the image forming apparatus 101 acquires the firmware from a local environment, the warning is displayed in accordance with the warning display policy registered in the contents distribution server 102, as long as communications can be performed with the contents distribution server 102.

FIG. 15 is a sequence diagram illustrating processing executed by the image forming apparatus 101 and the contents distribution server 102 according to the second exemplary embodiment, through which the image forming apparatus 101 performs the warning screen displaying. The processing executed by the image forming apparatus 101 illustrated in FIG. 15 is implemented by the CPU 201 loading a program stored in the HDD 204 or the ROM 202 onto the RAM 203 and executing the program as appropriate. The processing executed by the contents distribution server 102 illustrated in FIG. 15 is implemented by the CPU 301 loading a program stored in the HDD 304 or the ROM 302 onto the RAM 303 and executing the program as appropriate.

In step S1501, the image forming apparatus 101 detects a user operation of selecting firmware in the USB device through the operation unit 205, and the processing proceeds to step S1502.

In step S1502, the image forming apparatus 101 transmits a test communication to the contents distribution server 102. Upon receiving the test communication from the image forming apparatus 101, in step S1503, the contents distribution server 102 returns OK to the image forming apparatus 101.

When OK is returned to the image forming apparatus 101 from the contents distribution server 102 in step S1503, the processing proceeds to step S1504.

In step S1504, the image forming apparatus 101 transmits a warning permission information acquisition request to the contents distribution server 102. More specifically, in step S1504, the image forming apparatus 101 transmits to the contents distribution server 102 the value of the Warning-Ability attribute 803, the value of the Country attribute 804, and the operator based classification of the currently being executed mode (the service mode/the user mode). The contents distribution server 102 receives the warning permission information acquisition request transmitted from the image forming apparatus 101.

In step S1505, the contents distribution server 102 determines whether the warning is permitted as in step S903 in FIG. 9.

In step S1506, the contents distribution server 102 transmits warning permission information to the image forming apparatus 101 as a response to the request received in step S1504 described above. The warning permission information is information indicating whether a message corresponding to the firmware to be applied to the image forming apparatus 101 can be output, based on the result of determining whether the warning is permitted in step S1505 described above (the warning permitted flag or the warning not permitted flag). The image forming apparatus 101 receives the warning permission information transmitted from the contents distribution server 102.

In step S1507, the image forming apparatus 101 determines whether to display the warning as in step S906 in FIG. 9. In step S1508, the image forming apparatus 101 displays or does not display the warning as in step S907 in FIG. 9.

In step S1509, the image forming apparatus 101 acquires the firmware selected in step S1501 described above from the USB device. Then, in step S1510, the image forming apparatus 101 updates the firmware in the image forming apparatus 101 with the firmware acquired in step S1509 described above.

When OK is not returned from the contents distribution server 102 as a response to the test communication (i.e., when the test communication fails), the image forming apparatus 101 may determine that the warning is permitted or not permitted in step S1507 described above.

Through the processing described above, the image forming apparatus 101 can display or not display the warning in accordance with the policy set on the side of the contents distribution server 102, even when the firmware is updated with no network communication, that is, when firmware to be applied is acquired from a source other than the contents distribution server 102, as long as the communications can be performed with the contents distribution server 102.

In the first and the second exemplary embodiments described above, a configuration is described where the image forming apparatus 101 holds the warning display pattern table 700 illustrated in FIG. 7. However, it might be desirable to hold the warning display pattern table 700 illustrated in FIG. 7 on the side of the contents distribution server 102 to be flexibly changed. In a third exemplary embodiment, a configuration is described where the warning display pattern table 700 illustrated in FIG. 7 is also held on the side of the contents distribution server 102. More specifically, in the third exemplary embodiment, the warning display pattern table 700 illustrated in FIG. 7 is also held and managed in the HDD 304 of the contents distribution server 102. Here, the values in the warning display pattern table 700 can be individually set on the side of the image forming apparatus 101 and on the side of the contents distribution server 102.

A sequence of processing in a case where the warning display pattern table 700 is held and managed also on the side of the contents distribution server 102 is described below with reference to FIG. 16.

FIG. 16 is a diagram illustrating a sequence of processing executed by the image forming apparatus 101 and the contents distribution server 102 according to the third exemplary embodiment, through which the image forming apparatus 101 performs the warning screen displaying. The processing executed by the image forming apparatus 101 illustrated in FIG. 16 is implemented by the CPU 201 loading a program stored in the HDD 204 or the ROM 202 onto the RAM 203 and executing the program as appropriate. The processing executed by the contents distribution server 102 illustrated in FIG. 16 is implemented by the CPU 301 loading a program stored in the HDD 304 or the ROM 302 onto the RAM 303 and executing the program as appropriate.

When the image forming apparatus 101 can communicate with the contents distribution server 102, the image forming apparatus 101 according to the third exemplary embodiment controls the displaying of a message in accordance with the warning permission policy table 600 and the warning display pattern table 700 held on the side of the contents distribution server 102.

In step S1601, the image forming apparatus 101 transmits an applicable firmware list acquisition request and a warning instruction information acquisition request to the contents distribution server 102. More specifically, in step S1601, the image forming apparatus 101 transmits a value of the Family attribute 802 as well as the value of the firmversion attribute 801, the value of the WarningAbility attribute 803, the value of the Country attribute 804, and the operator based classification of a currently being executed mode (the service mode/the user mode) transmitted in step S901 in FIG. 9. The contents distribution server 102 receives the applicable firmware list acquisition request and the warning instruction information acquisition request transmitted from the image forming apparatus 101.

In step S1602, the contents distribution server 102 searches for the applicable firmware based on the value of the firmversion attribute 801 received in step S1601 described above as in step S902 in FIG. 9, and thus identifies the information on the firmware applicable to the image forming apparatus 101.

In step S1603, the contents distribution server 102 determines whether the warning is permitted in accordance with the table shown in FIG. 6 by using the value of the Country attribute 804, the operator based classification, and the value of the WarningAbility attribute 803 received in step S1601, as in step S903 in FIG. 9.

In step S1604, the contents distribution server 102 determines whether to instruct the displaying of the warning based on the result of the determination in step S1603 described above and the warning display pattern table 700. More specifically, upon determining that the warning is permitted in step S1603 described above, the contents distribution server 102 determines whether to instruct the displaying of the warning based on the warning display pattern table 700 by comparing the value of the Family attribute 802 received in step S1601 described above with the value of the Family of the applicable firmware found in step S1602 described above. On the other hand, upon determining that the warning is not permitted in step S1603 described above, the contents distribution server 102 determines not to instruct the displaying of the warning.

In step S1605, the contents distribution server 102 transmits to the image forming apparatus 101 the applicable firmware list and the warning instruction information representing the result of the determination in step S1604 described above, as a response to the request received in step S1601 described above. The image forming apparatus 101 receives the applicable firmware list and the warning instruction information transmitted from the contents distribution server 102.

In step S1606, the image forming apparatus 101 detects the firmware selected by the user based on the applicable firmware list received in step S1605 described above, as in step S905 in FIG. 9. When the user selects the firmware, the processing proceeds to step S1607.

In step S1607, the image forming apparatus 101 displays or does not display the warning based on the warning instruction information received in step S1605 described above. When the warning instruction information indicates that the warning is to be displayed (indicates a message to be output), the screen control unit 401 of the image forming apparatus 101 controls the displaying of the message indicated by the warning instruction information (for example, the UI screen 1300 as illustrated in FIG. 13 or the UI screen 1400 as illustrated in FIG. 14) on the operation unit 205. When an OK button in the UI screen on which the warning is displayed is pressed, the processing proceeds to step S1608. On the other hand, when a "cancel" button in the UI screen on which the warning is displayed is pressed, the processing in this sequence ends without any further processing.

When the warning instruction information indicates that the warning is not to be displayed, the screen control unit 401 of the image forming apparatus 101 does not display the warning and the processing proceeds to step S1608.

In step S1608, the image forming apparatus 101 transmits a firmware download request as in step S908 in FIG. 9, and downloads the firmware in step S1609. The contents distribution server 102 transmits the firmware to the image forming apparatus 101.

Then, in step S1610, the image forming apparatus 101 updates the firmware in the image forming apparatus 101 with the firmware downloaded in step S1609 described above.

Processing of acquiring firmware from a local environment such as a USB device, in a configuration where the warning display pattern table 700 is held and managed on the side of the contents distribution server 102 will be described with reference to FIG. 17.

FIG. 17 is another sequence diagram illustrating processing executed by the image forming apparatus 101 and the contents distribution server 102 according to the third exemplary embodiment, through which the image forming apparatus 101 performs the warning screen displaying. The processing executed by the image forming apparatus 101 illustrated in FIG. 17 is implemented by the CPU 201 loading a program stored in the HDD 204 or the ROM 202 onto the RAM 203 and executing the program as appropriate. The processing executed by the contents distribution server 102 illustrated in FIG. 17 is implemented by the CPU 301 loading a program stored in the HDD 304 or the ROM 302 onto the RAM 303 and executing the program as appropriate.

In step S1701, the image forming apparatus 101 detects a user operation of selecting firmware in the USB device through the operation unit 205 as in step S1501 in FIG. 15, and the processing proceeds to step S1702.

In step S1702, the image forming apparatus 101 transmits a test communication to the contents distribution server 102 as in step S1502 in FIG. 15. Upon receiving the test communication from the image forming apparatus 101, in step S1703, the contents distribution server 102 returns OK to the image forming apparatus 101.

When the test communication in step S1702 described above succeeds (when OK is returned from the contents distribution server 102 in step S1703), the processing proceeds to step S1704.

In step S1704, the image forming apparatus 101 transmits a warning instruction information acquisition request to the contents distribution server 102 as in step S1601 in FIG. 16. More specifically, in step S1704, the image forming apparatus 101 transmits to the contents distribution server 102 a value of the Family of the firmware to be applied, selected in step S1701 described above, as well as the value of the WarningAbility attribute 803, the value of the Country attribute 804, the operator based classification of a currently being executed mode (the service mode/the user mode), and the value of the Family attribute 802 transmitted in step S1601 in FIG. 16. The contents distribution server 102 receives the warning instruction information acquisition request transmitted from the image forming apparatus 101.

In step S1705, the contents distribution server 102 determines whether the warning is permitted based on the table illustrated in FIG. 6 by using the value of the Country attribute 804, the operator based classification, and the value of the WarningAbility attribute 803 received in step S1704 described above, as in step S903 in FIG. 9.

In step S1706, the contents distribution server 102 determines whether to instruct the displaying of the warning based on the determination result in step S1705 described above and the warning display pattern table 700 as in step S1604 in FIG. 16.

In step S1707, the contents distribution server 102 transmits the warning instruction information, which represents the result of the determination in step S1706 described above, to the image forming apparatus 101 as a response to the request received in step S1704 described above. Then, the image forming apparatus 101 receives the warning instruction information transmitted from the contents distribution server 102, and the processing proceeds to step S1710.

When OK is not returned from the contents distribution server 102 as a response to the test communication (when the test communication fails (NG in step S1708)), the processing proceeds to step S1709.

In step S1709, the image forming apparatus 101 determines that the warning is permitted, and determines whether to display the warning as in step S1508 in FIG. 15, and the processing proceeds to step S1710.

In step S1710, the image forming apparatus 101 displays or does not display the warning as in step S1607 in FIG. 16, regardless of whether the test communication has succeeded or failed.

In step S1711, the image forming apparatus 101 acquires the firmware selected in step S1701 described above from the USB device, as in step S1509 in FIG. 15. In step S1712, the image forming apparatus 101 updates the firmware in the image forming apparatus 101 with the firmware acquired in step S1711 described above, as in step S1510 in FIG. 15.

Through the processing illustrated in FIGS. 16 and 17, a pattern of permitting or not permitting the warning display and of displaying the warning on the side of the image forming apparatus 101 can be flexibly changed on the side of the contents distribution server 102.

As described above, the image forming apparatus 101 according to each of the exemplary embodiments described above makes an inquiry to the contents distribution server 102 when the firmware update is performed. Thus, the image forming apparatus 101 acquires information for controlling the warning display based on the policy information indicating whether to display the warning set on the contents distribution server 102 in advance. Then, the image forming apparatus 101 controls the displaying of the warning in accordance with the information. With the configuration described above, when the firmware in the image forming apparatus 101 is to be updated, the warning display can be controlled by determining whether the warning display is permitted based on remote settings. Accordingly, in a system in which the firmware in the image forming apparatus 101 is updated remotely through a network, firmware can be prevented from being erroneously installed, and a display setting, such as a warning on the side of the image forming apparatus 101, can be remotely and flexibly controlled in accordance with a condition of a sales company in each country.

In the exemplary embodiments described above, the case where a program such as firmware in the image forming apparatus is updated is described. An apparatus, for which the program such as firmware is updated, is not limited to the image forming apparatus, and may be a personal computer, a smartphone, and a network-connected household appliance. A program to be updated may be a program corresponding to an operating system or an application program. Thus, aspects of the present invention can be applied to a system in which programs in various information processing apparatuses are updated remotely through a network, so that a program can be prevented from being erroneously installed, and a display setting such as a warning on a side of the information processing apparatus in accordance with a condition of a sales company in each country can be remotely and flexibly controlled.

The configurations and the contents of various data described above are not limited to those described above, and the various data can have various configurations and contents in accordance with uses and objects.

The exemplary embodiments of the present invention are as described above. Aspects of the present invention may be further implemented as a system, an apparatus, a method, a program, a storage medium, or the like, for example. More specifically, aspects of the present invention may be applied to a system including a plurality of devices, or an apparatus including a single device.

Aspects of the present invention include all the combinations among the exemplary embodiments described above.

Additional embodiments can also be realized by a computer of a system or apparatus that reads out and executes computer executable instructions recorded on a storage medium (e.g., non-transitory computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-203716, filed Oct. 2, 2014, which is hereby incorporated by reference herein in its entirety.

What is claimed is:

1. A network system comprising:
an image forming apparatus; and
a management system configured to manage firmware in the image forming apparatus,
wherein the management system includes:
a first management unit configured to manage a first management table to determine whether a message related to firmware to be applied is able to be output according to an installed environment and an operation mode of the image forming apparatus,
a first reception unit configured to receive a request for information on applicable firmware from the image forming apparatus,
an identification unit configured to identify information on firmware applicable to the image forming apparatus from information on firmware that has been applied to the image forming apparatus included in the request,
a first determination unit configured to determine, based on an output ability of the image forming apparatus in the request and a result of referring to the first management table, whether the message related to the firmware to be applied is able to be output by the image forming apparatus, and
a response unit configured to transmit a response to the request, the response including the identified information on firmware and information indicating whether the message is able to be output as a result of the determination by the first determination unit, and
wherein the image forming apparatus includes:
a second management unit configured to manage a second management table to determine a message to be output according to a type of firmware,
a request unit configured to make the request,
a second reception unit configured to receive the response,
a second determination unit configured to determine a message to be output based on a result of referring to the second management table in a case where the response includes the information indicating that the message is able to be output, when firmware is applied, and
a control unit configured to control displaying of the message determined by the second determination unit.

2. The network system according to claim 1,
wherein in a case where the image forming apparatus acquires firmware to be applied from a source other than the management system, the request unit makes a request for information indicating whether a message related to the firmware to be applied is able to be output to the management system,
wherein the first reception unit receives the request, and
wherein the response unit transmits, as a response to the request, the information indicating whether the message is able to be output as a result of the determination by the first determination unit.

3. The network system according to claim 2, wherein the second determination unit determines not to output a message or output a message requesting checking in a case where the type of firmware that has been applied to the image forming apparatus and the type of firmware to be applied to the image forming apparatus are the same.

4. The network system according to claim 1, wherein the second management table includes information to determine a message to be output according to a type of firmware that has been applied to the image forming apparatus and a type of firmware to be applied to the image forming apparatus.

5. The network system according to claim 4, wherein the second determination unit determines to output a warning message indicating that a firmware type is different in a case where the type of firmware that has been applied to the image forming apparatus and the type of firmware to be applied to the image forming apparatus are different from each other.

6. The network system according to claim 1,
wherein the management system further includes:
a third management unit configured to manage a third management table to determine a message to be output according to a type of the firmware; and
a third determination unit configured to, in a case where the result of the determination by the first determination unit indicates that a message is able to be output, determine a message to be output from a result of referring to the third management table,
wherein the response unit transmits a response to the request, the response including the identified information on firmware and information indicating the message to be output as a result of the determination by the third determination unit, and
wherein, when firmware is applied, the control unit controls displaying of the message to be output in a case where the response includes information indicating the message to be output.

7. The network system according to claim 6,
wherein in a case where the image forming apparatus acquires firmware to be applied from a source other than the management system, the request unit makes a request for information indicating whether a message related to the firmware to be applied is to be output to the management system,
wherein the first reception unit receives the request, and
wherein the response unit transmits, as a response to the request, the information indicating the message to be output as a result of the determination by the third determination unit.

8. The network system according to claim 1, wherein the installed environment of the image forming apparatus includes information identifying a country in which the image forming apparatus is installed.

9. The network system according to claim 1, wherein the operation mode of the image forming apparatus includes at least an operation mode for a service person and an operation mode for an end user.

10. A control method performed in a network system including an image forming apparatus and a management system that manages firmware in the image forming apparatus, the control method comprising:
receiving a request for information on the applicable firmware from the image forming apparatus;
identifying information on firmware applicable to the image forming apparatus from information on firmware that has been applied to the image forming apparatus included in the request;
determining, based on an output ability of the image forming apparatus in the request and a result of referring to a first management table to determine whether a message related to firmware to be applied is able to be output according to an installed environment and an operation mode of the image forming apparatus, whether the message related to the firmware to be applied is able to be output by the image forming apparatus;
transmitting a response to the request, the response including the identified information on firmware and information indicating whether the message is able to be output;
making the request;
receiving the response;
determining a message to be output based on a result of referring to a second management table to determine a message to be output according to a type of firmware in a case where the response includes the information indicating that the message is able to be output, when firmware is applied; and
controlling displaying of the determined message.

* * * * *